United States Patent [19]

Leodolter

[11] 4,426,032

[45] Jan. 17, 1984

[54] TOOL SEALING ARRANGEMENT AND METHOD

[75] Inventor: Walter Leodolter, Rancho Palos Verdes, Calif.

[73] Assignee: The United States of America as represented by the Secretary of the Air Force, Washington, D.C.

[21] Appl. No.: 300,767

[22] Filed: Sep. 10, 1981

[51] Int. Cl.³ ............................................. B23K 20/14
[52] U.S. Cl. ................................. 228/157; 228/173 A
[58] Field of Search .................. 228/118, 157, 173 A, 228/265; 72/60; 29/157.3 V

[56] References Cited

U.S. PATENT DOCUMENTS

| | | | |
|---|---|---|---|
| 3,920,175 | 11/1975 | Hamilton et al. | 228/173 |
| 3,927,817 | 12/1975 | Hamilton et al. | 228/157 |
| 3,934,441 | 1/1976 | Hamilton et al. | 72/60 |
| 4,304,350 | 12/1981 | Paez et al. | 228/118 |
| 4,331,284 | 5/1982 | Schulz et al. | 228/157 |

*Primary Examiner*—Nicholas P. Godici
*Assistant Examiner*—M. Jordan
*Attorney, Agent, or Firm*—Donald J. Singer; John R. Flanagan

[57] ABSTRACT

A peripheral seal is formed between a pair of metal blanks and spaced opposing tools of superplastic forming and diffusion bonding apparatus by heating the blanks and pressurizing a region between inner and outer weld seams formed in the marginal peripheral edge portions of the blanks. After the blanks are converted by the apparatus into the formed component, the peripheral edge portions containing the seals are trimmed off.

5 Claims, 4 Drawing Figures

TOOL SEALING ARRANGEMENT AND METHOD

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to the superplastic forming and diffusion bonding process, and, more particularly, is concerned with a tool sealing arrangement and method which uses the workpiece itself to form the tool seal.

2. Description of the Prior Art

Superplastic forming and concurrent diffusion bonding (hereinafter denoted SPF/DB) is a relatively new technology used to produce sheet metal assemblies or components in a more cost effective manner than by the conventional riveting or welding methods. Only a few metals and alloys, such as titanium and its alloys, are suitable for use with this technology.

One significant part of the SPF/DB process is provision of an adequate tool seal. Various sealing arrangements are disclosed and illustrated in patents to Hamilton et al, U.S. Pat. No. 3,920,175; Hamilton et al, U.S. Pat. No. 3,927,817; and Hamilton et al, U.S. Pat. No. 3,934,441. Each of these patents uses either compression of the edge of the sheet metal between opposing surfaces of upper and lower tools or structural features on the tool surfaces. In all cases, the seal has to prevent the outside atmospheric gases from entering into the inner area between the tools. This inner area can only accept a benign gas, such as argon, to preclude surface contamination of the titanium sheet metal.

One approach to tool sealing, such as used in the tooling of the aforementioned patents, is to seal upper and lower tools along a common parting plane defined between the tools. However, this seal is a critical cost factor and probably the most difficult technical detail of the tooling system to devise. Generally, the upper and lower tools are massive steel or ceramic constructions which are exposed to the processing conditions of high pressure, such as up to 300 psi, and high temperature, such as 1650° to 1700° F. The temperature gradients through the tooling material during heat-up and cool-down cause the tools to undergo deformations which result in warpage and, therefore, mismatch in the parting planes.

Another approach to tool sealing is to enclose the entire tooling system in a welded sheet metal envelope. However, the costs associated with this arrangement prevent the technology from beccomming a cost competitive alternative to conventional fabrication methods. Installing, welding, and removing the envelope requires many labor hours.

Therefore, for the SPF/DB process to become a viable alternative to conventional techniques of welding and riveting for use in fabricating structures, such as wing skin panels for aircraft, from titanium sheet metal, a need exists for a simple, reliable, low cost sealing arrangement about the tooling periphery.

SUMMARY OF THE INVENTION

The present invention provides a tool sealing arrangement and method designed to satisfy the aforementioned needs. The unique feature of the present invention is the use of the peripheral area of the titanium sheet metal assembly itself to form a tool seal, thereby eliminating the necessity for a separate seal. This peripheral area is the normal trim-off area of the formed titanium component. By using the titanium sheet metal assembly to form the seal, no matching requirements are imposed on the tools because the expanding titanium material adjusts to the gap between the tools. This leads to a low cost tooling system. Surface preparation of the tools is not critical because the plasticity of the titanium material accommodates surface roughness and geometrical deviations from the theoretical surface.

Accordingly, the present invention is directed to a tool sealing arrangement for use in superplastic forming and diffusion bonding apparatus which includes upper and lower tools. The sealing arrangement is formed by the peripheries of a pair of metal blanks having effective strain rate sensitivity to be formed into a component assembly by the apparatus. The metal blanks are located between the tools with spaced apart inner and outer marginal peripheral edge portions of the blanks being connected together and expanded away from one another at a predetermined pressure greater than the working pressure between the tools. The expanded peripheral edge portions of the blanks form a seal between the blanks and tools which prevents outside atmospheric gases from entering between the tools.

In the method of forming the seal, during heat-up of the tools and prior to the initiation of the main SPF/DB process performed by the apparatus, the seal is formed by pressurization of the region between the inner and outer connections or seams in the peripheral edge portions of the blanks. Formation of the seal is completed when the actual SPF/DB operational temperature is reached. Thus, seal formation does not delay the component assembly fabrication process.

DETAILED DESCRIPTION OF THE INVENTION

Figure 1:
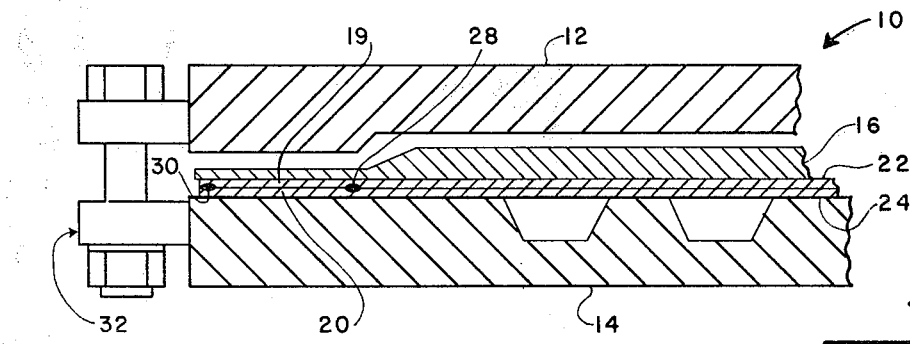
FIG. 1 is a fragmentary elevational view, in cross-section, of one form of the SPF/DB apparatus, in an initial stage, for forming the tool seal in accordance with the principles of the present invention.

Referring now to the drawings, and more particularly to FIG. 1, there is shown an exemplary embodiment of superplastic forming and diffusion bonding (SPF/DB) apparatus, generally designated 10, having upper and lower tools 12 and 14, and in some cases also a pressure plate 16 as shown. The apparatus 10 may take several suitable forms, one of which is an autoclave such as depicted in the drawings and another form being press type tools. In accordance with the principles of the present invention, a unique seal 18 (FIGS. 2 and 3) is formed between the peripheral edge of the tool 12, and the peripheral edge of the plate 16, being backed up by the peripheral edge of the tool 14, by using the marginal peripheral edge portions 19 and 20 of a pair of sheet metal blanks 22 and 24. (In the absence of the pressure plate 16, the seal would be formed between the peripheral edges of the tools alone.) The seal 18 prevents outside atmospheric gases from entering between the tools 12, 14 and contaminating the surfaces of the material forming the sheet metal blanks, such as titanium, its alloys or some other material having a strain rate sensitivity effective for exhibiting superplasticity. The region between the tools is thus sealed and may be filed with benign gas, such as argon, for use as environmental protection of the metal blanks during the SPF/DB process.

In general, the sealing concept underlying the present invention is characterized by the plastic deformation of the peripheries of the titanium sheet metal blanks 22, 24 to form the seal 18 during heat-up of the tools 12, 14 and plate 16 and prior to operation of the main SPF/DB process by the apparatus 10. Any tool mismatch tolerances between the tools 12, 14 are compensated for by the expansion of the titanium material between the tools to form the seal therewith.

As mentioned previously, FIGS. 1 to 3 illustrate the sealing concept in conjunction with apparatus of the autoclave type. For purposes of clarity, the sealing concept is illustrated and will be described in three steps: initial installation (FIG. 1); sealing forming (FIG. 2); and the actual SPF/DB operation (FIG. 3).

First, the upper and lower tools 12, 14 with the stacked pair of titanium sheet metal blanks 22, 24 installed therebetween are shown in FIG. 1. Also, the flexible pressure plate 16 is disposed on top of the stack of blanks between 22 and upper tool 12. This rather flexible pressure plate is normally used with large tools to provide positive means for diffusion bond pressure application on the to-be-bonded area of the component independent of tool contour variations from either fabrication tolerances or thermal effects. The pressure plate is not necessary for smaller tools.

Figure 4:
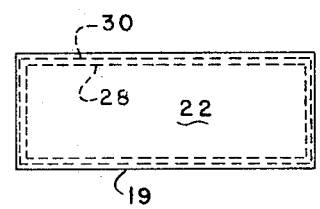
FIG. 4 is a schematic plan view, on a somewhat reduced scale, of the stacked blanks from which a formed component will be fabricated, illustrating by dashed peripheral lines the inner and outer weld seams in the peripheral edge portions of the blanks between which the tool seal will be formed.

The marginal peripheral edge portions 19, 20 of the titanium blanks 22, 24 are connected together by spaced apart inner and outer weld seams 28 and 30, the peripheral paths thereof being clearly shown in FIG. 4. As an example, the seams may be approximately 1 to 2 inches apart. The inner area of each blank bounded by the inner seam 30 is the portion thereof which will be converted into the formed component by the SPF/DB process to be described later. The strip or region between the seams 28, 30 becomes the seal 18 and is later severed from the formed component.

Figure 2:
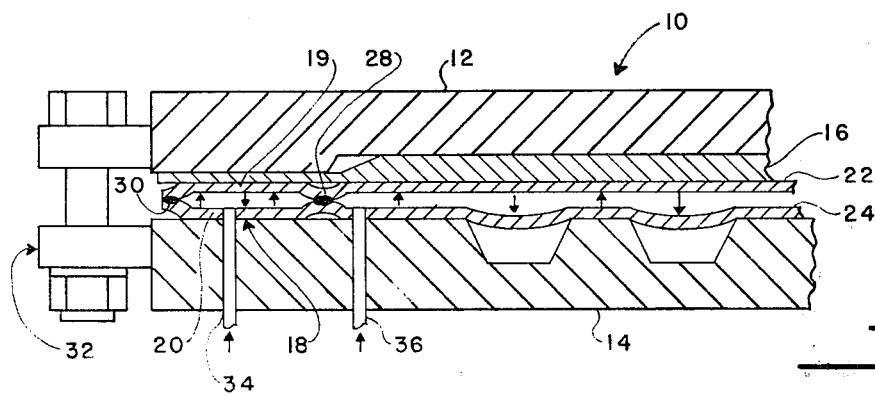
FIG. 2 is a view of the apparatus similar to that of FIG. 1, but showing formation of the seal between the upper and lower tools by the sheet metal blanks.
Figure 3:
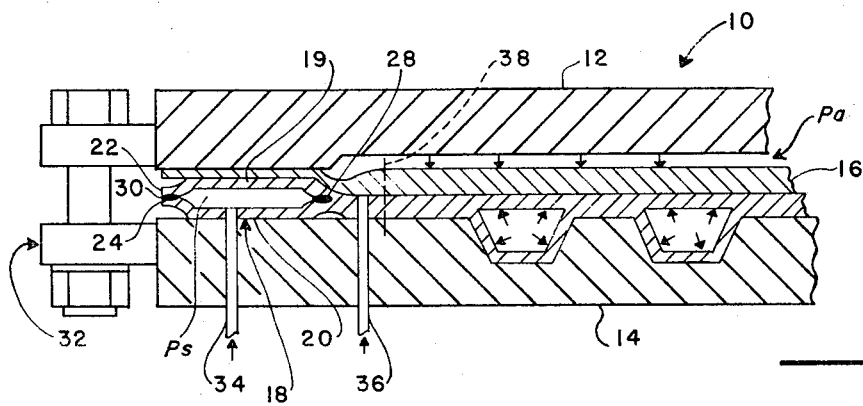
FIG. 3 is a view of the apparatus similar to that of FIG. 2, but showing conversion of the blanks into a formed component by the SPF/DB process.

The upper and lower tools 12, 14 are stationarily mounted by brackets 32 (only one of which is shown) so as to be separated by a gap such as seen in FIGS. 1 to 3. The gap may vary depending upon the geometrical condition of the tools after multiple exposures to heat-up and cool-down cycles. However, as has been mentioned before, the unique seal of the present invention compensates for gap variation during seal formation.

Next, FIG. 2 portrays heat-up of the tools in preparation for the SPF/DB process. It is during this phase that the seal is also being formed. Since these two functions are carried out concurrently, there is no delay or prolongation of the overall SPF/DB process by the seal formation technique of the present invention. The SPF/DB process will be carried out when the temperature is elevated to between 1650° F. to 1700° F. When the temperature reaches approximately 1000° F., seal pressure in the form of pressurized argon gas is applied into the region between the blanks and the seams thereof through an independent pressure inlet depicted schematically in FIGS. 2 and 3 as tube 34 which extends upward through lower tool 14 and blank 20. The inner region between the blanks is also pressurized during this time by argon gas through a separate pressure inlet tube 36 schematically shown in FIGS. 2 and 3 extending upward through lower tool 14 and blank 20. The tubes 34 and 36 are schematically depicted as extending upwardly through the tool 14 for purposes of clarity of illustration. Alternatively, the tubes may enter and penetrate their respective separate regions between the blanks 22 and 24 from one side thereof. This region between the blanks is pressurized just slightly to separate the blanks to prevent any diffusion bonding thereof where it is not desired. The pressures involved at this time in both the seal and inner regions are sufficient to cause expansion of the blanks away from one another and lifting of the pressure plate 16 upwardly against the upper tool 12. This condition generates the maximum design loads for the upper tool and for the joint or bracket 32 between the upper and lower tools 12, 14. These loads are relatively small because of the small area where the seal pressure is acting upon the tools.

The seal 18 thus develops at the peripheral interfaces between the titanium blanks and the opposing tool surfaces. The titanium metal in the near molten state pushes against the tool surfaces (via the pressure plate 16 in the case of the upper tool 12) to provide the seal. As the temperature of the tools and blanks increases, the seal becomes better. Seal testing is done by applying gas pressure on one side of the seal and measuring the gas flow across the seal at the other side. As the seal 16 becomes more and more effective, the gas flow decreases until it becomes virtually zero. From a functional standpoint, the seal is sufficient when a reasonable pressure drop can be developed across the seal to effectively apply the autoclave pressure forces upon the pressure plate. From an economic point of view, however, it is desired to have a near perfect seal because any volume of gas leaked from the tools must be considered as a loss.

Finally, after the seal 18 has been developed, autoclave pressure $P_a$ according to a predetermined schedule up to a maximum of 300 psi is applied, as depicted in FIG. 3, through suitable inlets (not shown) in upper tool 12 to initiate the SPF/DB process. The pressure plate 16 applies the autoclave pressure to the desired bond areas between the blanks 22, 24. However, at all times the seal pressure $P_s$ being applied is 10 to 50 psi higher than the autoclave pressure $P_a$ to maintain the effectiveness of the seal 18. Only a small pressure differential less than 10 psi is required to positively maintain the seal.

The forming and autoclave pressures at this time are controlled by the SPF/DB process requirements established to produce a given geometry in the formed component. The absence of upward forces from the pressure plate 16 as well as the effective low seal pressure reduce the forces acting on the tools during the relatively long process cycle. The low loads and consequently low stresses enhance the dimensional stability of the tools during the time when the material of the tools is vulnerable to high temperature creep.

It should be noted that the outer peripheries of the titanium blanks are exposed to the atmosphere during the SPF/DB process and the material becomes brittle when cooled down. This, however, is acceptable because the seal region is in the excess area of the material and is trimmed off the formed component at broken line 38 in FIG. 3.

It is thought that the unique seal of the present invention any many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. In superplastic forming and diffusion bonding apparatus which includes spaced, opposing tools, a tool sealing arrangement comprising:
    a pair of metal blanks having effective strain rate sensitivity to be formed into a component by said apparatus, said blanks being located between said tools and having spaced apart inner and outer marginal peripheral edge portions connected together and expanded away from one another so as to form a seal between said blanks and tools about the peripheries thereof.

2. The tool sealing arrangement as recited in claim 1, wherein said peripheral edge portions are connected together by inner and outer weld seams, with the region between said seams being expanded to cause said edge portions to form said seal with said tools.

3. The tool sealing arrangement as recited in claim 1 or 2, wherein said blank edge portions are expanded away from one another at a predetermined pressure which is greater than a working pressure used by said apparatus in converting said blanks into a formed component.

4. A method of forming a seal between spaced, opposing tools of superplastic forming and diffusion bonding apparatus, comprising the steps of:
    placing a pair of metal blanks between said tools, said blank being connected together by spaced apart inner and outer seams in peripheral edge portions of said blanks;
    heating said tools and said blanks disposed therebetween to a predetermined elevated temperature effective for plastic deformation of said blanks; and
    pressurizing the region between said seams of said blanks for expanding said blank edge portions away from one another to cause said edge portions to form a seal between said blanks and tools about the peripheries thereof.

5. The seal forming method as recited in claim 4, wherein said blank edge portions are maintained expanded away from one another at a predetermined pressure which is greater than a working pressure used by said apparatus in converting said blanks into a formed component.

* * * * *